Patented May 12, 1953

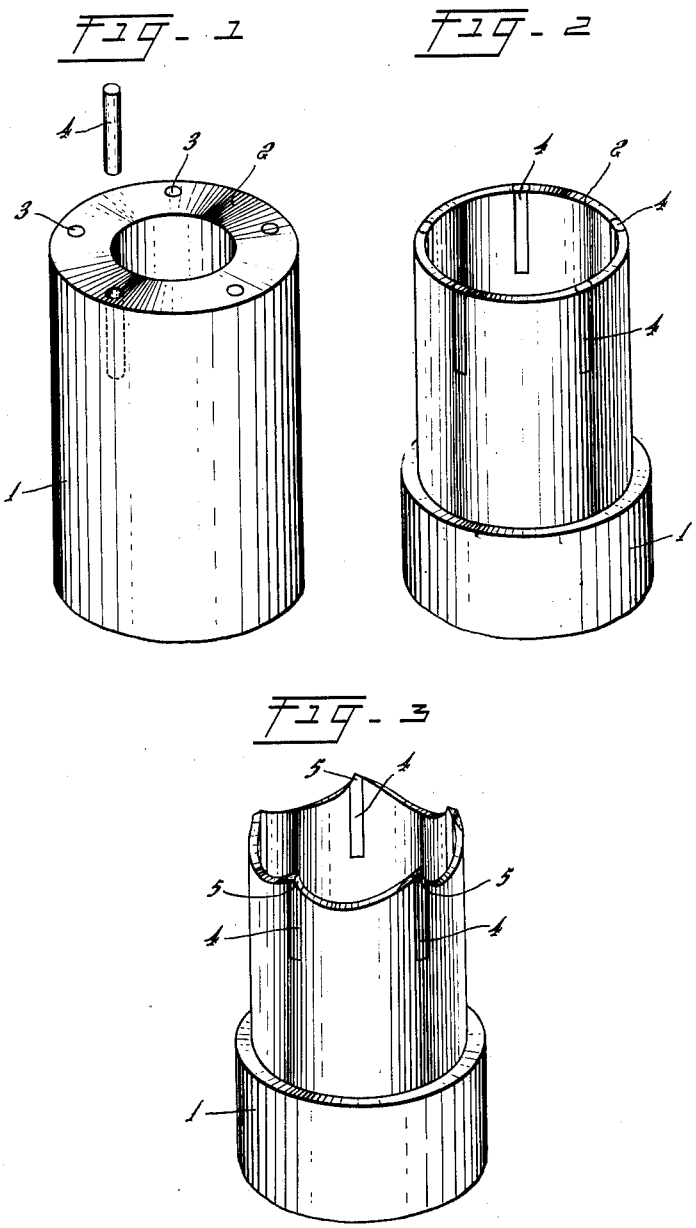

2,638,021

UNITED STATES PATENT OFFICE 2,638,021

CROWN DRILL AND METHOD OF MAKING SAME

Arnoldus Laurentius van der Heiden, Amersfoort, Netherlands, assignor to Vennootschap onder firma A. G. F. Knopenfabriek, Rhenen, Netherlands, a corporation of the Netherlands Application November 23, 1951, Serial No. 257,710
In the Netherlands October 20, 1951

3 Claims. (Cl. 79—16)

In various branches of industry, more particularly in the button industry, use is made of crown drills, which serve for drilling discs out of the material to be worked up, which discs are finished then to yield the desired final product.

In order to limit the loss of material to a minimum, the thickness of the wall of such crown drills should be as small as possible.

Initially these crown drills were made of ordinary steel. Afterwards they were manufactured from hard metal, but crown drills made from this material which is hard as glass and which is expensive, only had a limited life because, owing to the small thickness of their walls, the crown drills would soon break. Manufacturers, therefore, again proceeded to making the body of the drills from ordinary steel, while in recesses provided adjacent the cutting edges they secured pieces of hard metal by welding.

This manner of manufacturing crown drills proved to be not very satisfactory either, because it turned out to be hardly feasible to so secure the hard metal inserts that they would not soon become radially detached and get lost when the drill was used.

The present invention affords a method of providing a steel crown drill with hard metal inserts in such a manner that the danger of said inserts becoming detached is practically eliminated.

According to the invention a circumferential row of holes is so drilled into one end face of a steel cylinder that these holes are parallel to the axis of the cylinder, hard metal rods are secured in said holes by welding or brazing and the external and internal wall surfaces of the cylinder are machined in a portion extending from said one end face to form a crown drill having a wall of the desired thickness, in which the middle of the wall coincides or substantially coincides with the axes of the hard metal rods. In a crown drill made after the method according to the invention the hard metal inserts remain firmly embedded in the material of the body of the drill, so that these inserts are effectively prevented from being radially detached.

The invention will be illustrated hereinafter with reference to the accompanying drawing showing an embodiment of the method of manufacturing a crown drill, and wherein:

Fig. 1 is a perspective view illustrating an initial phase in the method of producing a thin-walled crown-drill in accordance with this invention;

Fig. 2 is a perspective view of an assembly for producing a crown-drill in accordance with the present invention and showing the assembly as it appears at the conclusion of an intermediate phase in the method; and Fig. 3 is a perspective view of a completed thin-walled crown-drill produced in accordance with this invention.

In the manufacture of a crown drill in accordance with the present invention a steel cylinder 1 having a relatively thick wall, as shown in Fig. 1, is initially provided. In the one end face 2 of said cylinder 1 a circumferential row of holes 3 is drilled, the axes of said holes being parallel to the axis of the cylinder.

Into each of the holes 3 a hard metal rod 4 is inserted, the rods 4 being secured to the steel cylinder 1 by welding or brazing.

Subsequently a portion of the length of the cylinder 1 adjacent the end having the holes 3 is internally and externally machined so as to reduce this wall portion of the cylinder to a thickness desirable for the wall of the crown drill (Fig. 2). In doing so care is taken that the axes of the hard metal inserts 4 will lie in or approximately in the middle of the wall portion of reduced thickness of the crown drill. As a result said inserts 4, even if they are also machined over their entire length during the machining of the cylinder 1, will remain firmly embedded in the material of the cylinder 1, and radial movement of the inserts is prevented by the curved surfaces of the sockets or holes 3 in which such inserts are received.

The end face of the crown drill thus obtained is finally finished by giving it the scalloped shape shown in Fig. 3, where the drilling teeth 5 are formed by the hard metal inserts, and the crown drill is then ready for use. The crown drill thus obtained has a remarkably long life, only needs grinding at wide intervals and is free of the drawback that the hard metal drilling teeth will become radially detached from the steel body of the drill.

I claim:

1. A method of manufacturing a thin-walled crown-drill comprising the steps of forming a series of circumferentially spaced and axially extending bores in one end face of a relatively thick-walled steel cylinder, securing a round hard metal rod in each of said bores, machining away the internal and external wall surfaces of said cylinder at least in a portion of the length of the latter extending to said one end face to provide a thin wall portion of a thickness at least as small as the original diameter of said rods and with the axes of said rods being disposed midway between the internal and external surfaces of said thin wall portion, and shaping said one end face of the cylinder to relieve the areas of said one end face between said rods and to point the exposed ends of the latter.

2. A method according to claim 1; wherein said machining away of the internal and external wall surfaces of the cylinder is continued until the thickness of said thin wall portion is substantially less than the original diameter of said rods so that the rods are exposed and cut-away at the inside and outside of said thin wall portion and radial movement of said rods is prevented by the remaining curved contacting surfaces of said rods and bores.

3. A thin-walled crown-drill comprising a steel cylinder having a thin wall portion of reduced thickness extending from one end thereof, a series of circumferentially spaced and axially extending recesses formed in said cylinder and opening at said one end of the latter and at the inner and outer wall surfaces of said thin wall portion, the confronting edges of each of said recesses being formed in cross-section as diametrically opposed sections of a circle, and a hard metal insert secured in each of said recesses and conforming at its opposite edges to said confronting edges of the related recess, the radially inward and outward faces of each insert being concave and convex, respectively, to conform to the contours of said inner and outer wall surfaces of said thin wall portion, said one end of the cylinder being relieved between said inserts to expose the ends of the latter and said ends of the inserts being pointed to constitute cutting tools.

ARNOLDUS LAURENTIUS v. D. HEIDEN.

References Cited in the file of this patent

UNITED STATES PATENTS

| Number | Name | Date |
|---|---|---|
| 955,877 | Iler | Apr. 26, 1910 |
| 1,041,568 | Bade | Oct. 15, 1912 |
| 1,506,119 | Hansen | Aug. 26, 1924 |
| 2,579,268 | Malherbe | Dec. 18, 1951 |